United States Patent
Blazejewski et al.

(10) Patent No.: US 10,759,974 B2
(45) Date of Patent: *Sep. 1, 2020

(54) REMOVABLE PRESSURE-SENSITIVE ADHESIVE STRIP

(71) Applicant: tesa SE

(72) Inventors: Anna Blazejewski, Hamburg (DE); Axel Burmeister, Hamburg (DE); Franciska Lohmann, Hamburg (DE); Anika Petersen, Bimöhlen (DE)

(73) Assignee: TESA SE, Norderstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,109

(22) Filed: Aug. 26, 2019

(65) Prior Publication Data

US 2019/0390087 A1 Dec. 26, 2019

Related U.S. Application Data

(63) Continuation of application No. 15/561,808, filed as application No. PCT/EP2016/056785 on Mar. 29, 2016, now Pat. No. 10,435,594.

(30) Foreign Application Priority Data

Apr. 2, 2015 (EP) .................................. 15162318

(51) Int. Cl.
*C09J 7/38* (2018.01)
*C09J 7/10* (2018.01)
(Continued)

(52) U.S. Cl.
CPC .............. *C09J 7/387* (2018.01); *B29B 7/485* (2013.01); *B29B 7/487* (2013.01); *C08K 5/01* (2013.01);
(Continued)

(58) Field of Classification Search
None
See application file for complete search history.

(56) References Cited

U.S. PATENT DOCUMENTS

| 4,024,312 A | 5/1977 | Korpman |
| 4,735,837 A | 4/1988 | Miyasaka et al. |

(Continued)

FOREIGN PATENT DOCUMENTS

| CN | 1617914 A | 5/2005 |
| CN | 102702990 A | 10/2012 |

(Continued)

OTHER PUBLICATIONS

Korean Office Action dated Apr. 29, 2019, corresponds to Korean Application No. 10-2017-7031805.

(Continued)

*Primary Examiner* — Frank D Ducheneaux
(74) *Attorney, Agent, or Firm* — Norris McLaughlin, P.A.

(57) ABSTRACT

Pressure-sensitive adhesive (PSA) strips, configured or adapted for the residue-free and non-destructive removal by which by substantially expanding it in the plane of adhesion, are provided. The PSA strips comprise at least one adhesive compound layer consisting of a PSA compound, constituted by vinyl aromatic block copolymers and one or more adhesive resins, at least 75 wt.-% (relative to the total amount of resin) of a resin being selected that has a DACP (diacetone alcohol cloud point) of greater than −20° C., and a softening point (ring & ball) of greater than or equal to 70° C., and the PSA compound has being foamed.

20 Claims, 8 Drawing Sheets

(51) Int. Cl.
*C09J 7/20* (2018.01)
*C09J 5/08* (2006.01)
*C09J 153/02* (2006.01)
*C09J 11/08* (2006.01)
*C08K 5/01* (2006.01)
*C08K 7/22* (2006.01)
*B29B 7/48* (2006.01)

(52) U.S. Cl.
CPC ............... *C08K 7/22* (2013.01); *C09J 5/08* (2013.01); *C09J 7/10* (2018.01); *C09J 7/20* (2018.01); *C09J 11/08* (2013.01); *C09J 153/02* (2013.01); *C08K 2201/005* (2013.01); *C08L 2205/20* (2013.01); *C09J 2201/122* (2013.01); *C09J 2201/128* (2013.01); *C09J 2201/60* (2013.01); *C09J 2201/606* (2013.01); *C09J 2201/618* (2013.01); *C09J 2201/622* (2013.01); *C09J 2203/318* (2013.01); *C09J 2203/322* (2013.01); *C09J 2203/326* (2013.01); *C09J 2205/102* (2013.01); *C09J 2205/11* (2013.01); *C09J 2205/114* (2013.01); *C09J 2425/00* (2013.01); *C09J 2453/00* (2013.01)

(56) References Cited

U.S. PATENT DOCUMENTS

| | | |
|---|---|---|
| 4,885,170 A | 12/1989 | Hamill et al. |
| 5,409,189 A | 4/1995 | Luhmann |
| 5,491,012 A | 2/1996 | Luhmann et al. |
| 5,507,464 A | 4/1996 | Hamerski et al. |
| 5,626,931 A | 5/1997 | Luhmann |
| 5,626,932 A | 5/1997 | Luhmann et al. |
| 5,672,402 A | 9/1997 | Kreckel et al. |
| 5,897,949 A | 4/1999 | Luhmann et al. |
| 5,967,474 A | 10/1999 | doCanto et al. |
| 6,004,665 A | 12/1999 | Luhmann et al. |
| 6,129,983 A | 10/2000 | Schumann et al. |
| 6,245,177 B1 | 6/2001 | Luhmann |
| 6,280,840 B1 | 8/2001 | Luhmann et al. |
| 6,284,378 B1 | 9/2001 | Junghans et al. |
| 6,342,720 B1 | 1/2002 | Presting et al. |
| 6,372,335 B1 | 4/2002 | Luhmann et al. |
| 6,395,389 B1 | 5/2002 | Luhmann et al. |
| 6,402,875 B1 | 6/2002 | Luhmann et al. |
| 6,544,639 B1 | 4/2003 | Luhmann et al. |
| 6,641,892 B2 | 11/2003 | Luhmann |
| 6,680,096 B1 | 1/2004 | Luhmann et al. |
| 6,841,241 B2 | 1/2005 | Luhmann et al. |
| 6,874,740 B1 | 4/2005 | Leiber et al. |
| 7,063,887 B2 | 6/2006 | Kobe et al. |
| 7,101,615 B2 | 9/2006 | Luhmann et al. |
| 7,264,870 B2 | 9/2007 | Luhmann et al. |
| 8,053,071 B2 | 11/2011 | Choi et al. |
| 9,126,771 B2 | 9/2015 | Saison et al. |
| 2002/0017359 A1 | 2/2002 | Luhmann |
| 2002/0034628 A1 | 3/2002 | Luhmann et al. |
| 2002/0051875 A1 | 5/2002 | Luhmann et al. |
| 2002/0168516 A1 | 11/2002 | Luhmann et al. |
| 2004/0241417 A1 | 12/2004 | Fischer et al. |
| 2009/0181250 A1 | 7/2009 | Zmarsly et al. |
| 2010/0148127 A1 | 6/2010 | Ellinger et al. |
| 2011/0120615 A1 | 5/2011 | Zmarsly et al. |
| 2011/0223394 A1 | 9/2011 | Daigaku et al. |
| 2012/0111494 A1 | 5/2012 | Krawinkel et al. |
| 2013/0023622 A1 | 1/2013 | Lu et al. |
| 2013/0108408 A1 | 5/2013 | Saison et al. |
| 2015/0037559 A1 | 2/2015 | Dollase et al. |
| 2015/0037560 A1 | 2/2015 | Dollase et al. |
| 2015/0166779 A1 | 6/2015 | Diehl et al. |
| 2015/0337177 A1 | 11/2015 | Krawinkel et al. |
| 2016/0083549 A1 | 3/2016 | Zmarsly et al. |
| 2016/0145406 A1 | 5/2016 | Bieber et al. |
| 2016/0285120 A1 | 9/2016 | Nakano et al. |

FOREIGN PATENT DOCUMENTS

| | | |
|---|---|---|
| DE | 33 31 016 A1 | 10/1984 |
| DE | 35 37 433 A1 | 10/1986 |
| DE | 42 22 849 C1 | 6/1993 |
| DE | 42 33 872 A1 | 3/1994 |
| DE | 44 28 587 A1 | 2/1996 |
| DE | 44 31 914 A1 | 3/1996 |
| DE | 195 11 288 A1 | 10/1996 |
| DE | 195 31 696 A1 | 3/1997 |
| DE | 196 49 636 A1 | 6/1998 |
| DE | 196 49 727 A1 | 6/1998 |
| DE | 196 49 728 A1 | 6/1998 |
| DE | 196 49 729 A1 | 6/1998 |
| DE | 197 08 364 A1 | 9/1998 |
| DE | 197 20 145 A1 | 11/1998 |
| DE | 197 23 177 A1 | 12/1998 |
| DE | 197 23 198 A1 | 12/1998 |
| DE | 197 56 816 C1 | 2/1999 |
| DE | 197 56 084 A1 | 7/1999 |
| DE | 198 20 858 A1 | 11/1999 |
| DE | 198 42 864 A1 | 3/2000 |
| DE | 198 42 865 A1 | 3/2000 |
| DE | 199 38 693 A1 | 2/2001 |
| DE | 10 2008 038 471 A1 | 8/2001 |
| DE | 10 2008 004 388 A1 | 7/2009 |
| DE | 10 2012 223 670 A1 | 6/2014 |
| EP | 0 257 984 A2 | 3/1988 |
| EP | 0 693 097 B1 | 1/1999 |
| EP | 0 894 841 A2 | 2/1999 |
| EP | 1 371 703 A2 | 12/2003 |
| EP | 1 102 809 B2 | 6/2005 |
| EP | 1 308 492 B1 | 9/2005 |
| JP | 2012-508287 A | 4/2012 |
| JP | 2015-030854 A | 2/2015 |
| JP | 2015-042741 A | 3/2015 |
| JP | 2016-529358 A | 9/2016 |
| KR | 10 2011 0084371 A | 7/2011 |
| WO | 98/18878 A1 | 5/1988 |
| WO | 92/11332 A1 | 7/1992 |
| WO | 92/11333 A1 | 7/1992 |
| WO | 94/21157 A1 | 9/1994 |
| WO | 94/22971 A | 10/1994 |
| WO | 95/06691 A1 | 3/1995 |
| WO | 95/31225 A1 | 11/1995 |
| WO | 97/07172 A1 | 2/1997 |
| WO | 98/03601 A1 | 1/1998 |
| WO | 99/31193 A1 | 6/1999 |
| WO | 99/37729 A1 | 7/1999 |
| WO | 99/63018 A1 | 12/1999 |
| WO | 00/12644 A1 | 3/2000 |
| WO | 03 066768 A2 | 8/2003 |
| WO | 03/066768 A2 | 8/2003 |
| WO | 2004/108851 A1 | 12/2004 |
| WO | 2009/114683 A1 | 9/2009 |
| WO | 2010/077541 A1 | 7/2010 |
| WO | 2010/078396 A2 | 7/2010 |
| WO | 2010/141248 A1 | 12/2010 |
| WO | 2011/124782 A1 | 10/2011 |
| WO | 2014/095382 A | 6/2014 |

OTHER PUBLICATIONS

English Translation of Chinese Office Action dated Apr. 19, 2019, corresponds to Chinese Application No. 201680020720.1.
English translation Japanese Office Action for corresponding Japanese application No. 2017-5551053 dated Oct. 1, 2018.
Polymer Handbook [J. Brandrup, E. H. Immergut, E. A. Grulke (Eds.), Polymer Handbook, 4th edn. 1999, Wiley, New York.
Schlademan, James, "Best performance: compatibility is essential when it comes to the performance of hydrocarbon tackifier resins used in hotmelt adhesives", European Adhesives & Sealants, Sep. 1, 2003, p. 10.
Cray Valley: "Product Bulletin Wingtack Resins", Oct. 12, 2015, pp. 1-12.

REMOVABLE PRESSURE-SENSITIVE ADHESIVE STRIP

CROSS-REFERENCE TO RELATED APPLICATIONS

This application is a continuation application of U.S. Ser. No. 15/561,808, filed on Sep. 26, 2017, which is a 371 of PCT/EP2016/056785, filed Mar. 29, 2016, which claims foreign priority benefit under 35 U.S.C. § 119 of the European Patent Application No. 15162318.8 filed Apr. 2, 2015, the disclosures of which are incorporated herein by reference.

The invention relates to a pressure-sensitive adhesive strip based on vinyl block copolymers, which is of high tensile strength and can be used to produce a bond which can be parted again by extensive stretching in the direction of the bond plane.

BACKGROUND OF THE DISCLOSURE

Self-adhesive tapes which have high elastic or plastic extensibility and which can be redetached without residue or destruction by extensive stretching within the bond plane are known from, for example, U.S. Pat. No. 4,024,312 A, DE 33 31 016 C2, WO 92/11332 A1, WO 92/11333 A1, DE 42 22 849 C1, WO 95/06691 A1, DE 195 31 696 A1, DE 196 49 727 A1, DE 196 49 728 A1, DE 196 49 729 A1, DE 197 08 364 A1, DE 197 20 145 A1, DE 198 20 858 A1, WO 99/37729 A1 and DE 100 03 318 A1 and are also referred to below as strippable self-adhesive tapes.

These strippable self-adhesive tapes are oftentimes used in the form of adhesive film strips which are pressure-sensitive on one or both sides, preferably having a non-adhesive grip region from which the detachment operation is initiated. Particular applications of such self-adhesive tapes are found in publications including DE 42 33 872 C1, DE 195 11 288 C1, U.S. Pat. No. 5,507,464 B1, U.S. Pat. No. 5,672,402 B1 and WO 94/21157 A1. Specific embodiments are also described in DE 44 28 587 C1, DE 44 31 914 C1, WO 97/07172 A1, WO 98/03601 A1 and DE 196 49 636 A1, DE 197 23 177 A1, DE 197 23 198 A1, DE 197 56 084 C1, DE 197 56 816 A1, DE 198 42 864 A1, DE 198 42 865 A1, WO 99/31193 A1, WO 99/37729 A1, WO 99/63018 A1, WO 00/12644 A1 and DE 199 38 693 A1.

Preferred fields of use of aforementioned strippable adhesive-film strips include in particular the residuelessly and nondestructively redetachable fixing of light-weight and medium-weight articles in the residential, work, and office segments. For use in the work and office segments, the products used are generally of considerable thickness, of more than 400 µm.

In the consumer electronics industry—such as, for example, in the production of mobile telephones, digital cameras or laptops—there is an ever-growing desire for a possibility of separating the individual components on disposal after they have been used. Some components can then be reused or recycled. Or at least separate disposal is possible. There is therefore great interest within this industry in redetachable adhesive bonds. In particular, adhesive tapes which can be easily removed as and when desired, while possessing a high holding performance, constitute a reasonable alternative here to adhesive strips which must first be pretreated, by heating, for example, in order to be detached.

Within the consumer electronics segment, the preference is for adhesive strips which are extremely thin, since the end devices are extremely thin and hence all of the individual components are to take up little space as well.

When very thin strippable adhesive strips are used which operate without carriers, there is increased incidence of tears (see DE 33 31 016 C2). If the adhesive strips tear, then detachment is generally no longer possible, however, since the remnant of the adhesive strip springs back into the joint and there is therefore no grip tab available.

WO 92/11333 A1 describes a strippable adhesive tape which uses as its carrier a highly stretchable film with a resilience after stretching of <50%.

WO 92/11332 A1 describes an adhesive film strip which is redetachable by pulling in the bond plane and for which the carrier utilized may be a highly stretchable, substantially nonresilient film. Adhesives employed are exclusively UV-crosslinked acrylate copolymers, with which it is not possible to achieve the high bond strengths, and which undergo a smaller loss of peel adhesion during stretching than is the case, for example, for adhesives based on vinylaromatic block copolymer.

Further publications such as WO 2010/141248 A1 describe systems comprising pressure-sensitive polyisobutylene adhesives, which likewise exhibit a low peel adhesion.

A strippable adhesive film strip having a foamed, non-pressure-sensitive adhesive film carrier is described in WO 95/06691 A1, DE 196 49 727 A1, DE 196 49 728 A1, DE 196 49 729 A1 and DE 198 20 858 A1. Because of the intermediate carrier of foam material, a small thickness for the adhesive film strip, of below 200 µm, is not possible.

Foamed pressure-sensitive adhesive composition systems have long been known and are described in the prior art. In principle, polymer foams can be produced in two ways. One way is via the effect of a blowing gas, whether added as such or resulting from a chemical reaction, and a second way is via incorporation of hollow beads into the material matrix. Foams that have been produced by the latter route are referred to as syntactic foams.

Compositions foamed with hollow microbeads are notable for a defined cell structure with a homogeneous size distribution of the foam cells. With hollow microbeads, closed-cell foams without voids are obtained, the features of which include better sealing action against dust and liquid media compared to open-cell variants. Furthermore, chemically or physically foamed materials have a greater propensity to irreversible collapse under pressure and temperature, and frequently show lower cohesive strength.

Particularly advantageous properties can be achieved when the microbeads used for foaming are expandable microbeads (also referred to as "microballoons"). By virtue of their flexible, thermoplastic polymer shell, foams of this kind have higher adaptation capacity than those filled with non-expandable, non-polymeric hollow microbeads (for example hollow glass beads). They have better suitability for compensation for manufacturing tolerances, as is the rule, for example, in the case of injection-molded parts, and can also better compensate for thermal stresses because of their foam character.

Furthermore, it is possible to further influence the mechanical properties of the foam via the selection of the thermoplastic resin of the polymer shell. For example, even when the foam has a lower density than the matrix, it is possible to produce foams having higher cohesive strength than with the polymer matrix alone. For instance, typical foam properties such as adaptation capacity to rough surfaces can be combined with a high cohesive strength for self-adhesive foams.

EP 0 257 984 A1 discloses adhesive tapes which at least on one side have a foamed adhesive coating. Contained within this adhesive coating are polymer beads which in turn comprise a hydrocarbon liquid and which expand at elevated temperatures. The scaffold polymers of the self-adhesive compositions may consist of rubbers or polyacrylates. The microballoons here are added either before or after the polymerization. The microballoon-containing self-adhesive compositions are processed from solvent and shaped to form adhesive tapes. The step of foaming takes place logically after the coating operation. In this way, micro-rough surfaces are obtained. This results in properties such as, in particular, nondestructive redetachability and repositionability. The effect of the better repositionability by means of micro-rough surfaces of self-adhesive compositions foamed using microballoons is also described in other specifications such as DE 35 37 433 A1 or WO 95/31225 A1.

The micro-rough surface is used in order to produce bubble-free bonding. The same use is also disclosed by EP 0 693 097 A1 and WO 98/18878 A1. Self-adhesive compositions foamed using microballoons are also known from specifications U.S. Pat. No. 4,885,170 A and EP 1 102 809 B, where they are employed, however, as a filler for adhesive tapes for permanent bonding which are not redetachable.

Among the devices in the consumer electronics industry are electronic, optical and precision devices, in the context of this application especially those devices as classified in Class 9 of the International Classification of Goods and Services for the Registration of Marks (Nice classification); 10th edition (NCL(10-2013)), to the extent that these are electronic, optical or precision devices, and also clocks and time-measuring devices according to Class 14 (NCL(10-2013)), such as, in particular,

- scientific, marine, measurement, photographic, film, optical, weighing, measuring, signaling, monitoring, rescuing, and instruction apparatus and instruments;
- apparatus and instruments for conducting, switching, converting, storing, regulating and monitoring electricity;
- image recording, processing, transmission, and reproduction devices, such as televisions and the like;
- acoustic recording, processing, transmission, and reproduction devices, such as broadcasting devices and the like;
- computers, calculating instruments and data-processing devices, mathematical devices and instruments, computer accessories, office instruments—for example, printers, faxes, copiers, typewriters—, data-storage devices;
- telecommunications devices and multifunction devices with a telecommunications function, such as telephones and answering machines;
- chemical and physical measuring devices, control devices, and instruments, such as battery chargers, multimeters, lamps, and tachometers;
- nautical devices and instruments;
- optical devices and instruments;
- medical devices and instruments and those for sportspeople;
- clocks and chronometers;
- solar cell modules, such as electrochemical dye solar cells, organic solar cells, and thin-film cells;
- fire-extinguishing equipment.

Technical development is going increasingly in the direction of devices which are ever smaller and lighter in design, allowing them to be carried at all times by their owner, and usually being generally carried. This is now accomplished increasingly by realization of low weights and/or suitable size of such devices. Such devices are also referred to as mobile devices or portable devices for the purposes of this specification. In this development trend, precision and optical devices are increasingly being provided (also) with electronic components, thereby raising the possibilities for minimization. On account of the carrying of the mobile devices, they are subject to increased loads—in particular, to mechanical loads—as for instance by impact on edges, by being dropped, by contact with other hard objects in a bag, or else simply by the permanent motion involved in being carried per se. Mobile devices, however, are also subject to a greater extent to loads due to moisture exposure, temperature influences, and the like, than those "immobile" devices which are usually installed in interiors and which move little or not at all.

BRIEF SUMMARY OF THE DISCLOSURE

The invention accordingly refers with particular preference to mobile devices, since the adhesive used in accordance with the invention has a particular benefit here on account of its unexpectedly good properties (very high shock resistance). Listed below are a number of portable devices, without wishing the representatives specifically identified in this list to impose any unnecessary restriction with regard to the subject-matter of the invention.

- Cameras, digital cameras, photography accessories (such as light meters, flashguns, diaphragms, camera casings, lenses, etc.), film cameras, video cameras,
- small computers (mobile computers, handheld computers, handheld calculators), laptops, notebooks, netbooks, ultrabooks, tablet computers, handhelds, electronic diaries and organizers (called "electronic organizers" or "personal digital assistants", PDAs, palmtops), modems,
- computer accessories and operating units for electronic devices, such as mice, drawing pads, graphics tablets, microphones, loudspeakers, games consoles, gamepads, remote controls, remote operating devices, touchpads,
- monitors, displays, screens, touch-sensitive screens (sensor screens, touchscreen devices), projectors,
- reading devices for electronic books ("E-books"),
- mini TVs, pocket TVs, devices for playing films, video players,
- radios (including mini and pocket radios), Walkmans, Discmans, music players for e.g. CDs, DVDs, Blu-ray, cassettes, USB, MP3, headphones,
- cordless telephones, mobile phones, smartphones, two-way radios, hands-free telephones, devices for summoning people (pagers, bleepers),
- mobile defibrillators, blood sugar meters, blood pressure monitors, step counters, pulse meters,
- torches, laser pointers,
- mobile detectors, optical magnifiers, binoculars, night vision devices,
- GPS devices, navigation devices, portable interface devices for satellite communications,
- data storage devices (USB sticks, external hard drives, memory cards),
- wristwatches, digital watches, pocket watches, chain watches, stopwatches.

For these devices, a particular requirement is for adhesive tapes having high holding performance that are removable easily as and when desired.

In addition, it is important that the holding performance of the adhesive tapes does not fail when the electronic device, for example a cellphone, is dropped and hits the ground. The adhesive strip must thus have very high shock resistance.

It is an object of the invention to find an adhesive strip which is redetachable without residue or destruction by stretching especially in the direction of the bond plane, which has an adhesive based on vinylaromatic block copolymers, and which exhibits particularly high shock resistance in the x,y-plane and also in the z-plane at the same time as having reduced detachment force.

The object is achieved in accordance with the invention with a pressure-sensitive adhesive strip of the generic type as recorded in the main claim. The dependent claims provide advantageous developments of the pressure-sensitive adhesive strip.

The invention accordingly relates to a pressure-sensitive adhesive strip which is redetachable without residue or destruction by extensive stretching substantially within the bond plane, comprising a layer of adhesive, the layer of adhesive consisting of a pressure-sensitive adhesive which is constructed on the basis of vinylaromatic block copolymers and tackifying resins, with selection to an extent of at least 75% by weight (based on the total resin content) of a resin having a DACP (diacetone alcohol cloud point) of greater than −20° C., preferably greater than 0° C., and a softening temperature (ring & ball) of not less than 70° C., preferably not less than 100° C., and the pressure-sensitive adhesive having been foamed.

For relevantly known, strippable adhesive film strips to be redetachable easily and without residue, they are required to possess certain technical bonding properties:

On stretching, the tackiness of the adhesive film strips must drop significantly. The lower the bonding performance in the stretched state, the less the extent to which the substrate will be damaged during detachment.

This property is particularly evident in adhesives based on vinylaromatic block copolymers, for which the tackiness drops to below 10% in the vicinity of the yield point.

For strippable adhesive tapes to be redetachable easily and without residue, they are required to have certain mechanical properties in addition to the technical bonding properties described above.

With particular advantage, the ratio of the tensile force to the stripping force is greater than two, preferably greater than three.

The stripping force here is the force which has to be expended in order to part an adhesive strip from a bonded joint again, by a parallel pulling in the direction of the bond plane. This stripping force is made up of the force which is needed, as described above, to detach the adhesive tape from the bond substrates, and of the force which must be expended in order to cause deformation of the adhesive tape. The force needed for deformation of the adhesive tape is dependent on the thickness of the adhesive film strip.

Within the thickness range of the adhesive film strip under consideration (20 to 2000 μm), in contrast, the force that is needed for detachment is independent of the thickness of the adhesive strips.

Preferably, the vinylaromatic block copolymer is at least one synthetic rubber in the form of a block copolymer having an A-B, A-B-A, $(A-B)_n$, $(A-B)_nX$ or $(A-B-A)_nX$ structure, in which
- the A blocks are independently a polymer formed by polymerization of at least one vinylaromatic;
- the B blocks are independently a polymer formed by polymerization of conjugated dienes having 4 to 18 carbon atoms and/or isobutylene, or a partly or fully hydrogenated derivative of such a polymer;

X is the radical of a coupling reagent or initiator; and
n is an integer≥2.

More particularly, all synthetic rubbers in the pressure-sensitive adhesive of the invention are block copolymers having a construction as set out above. The pressure-sensitive adhesive of the invention may thus also comprise mixtures of various block copolymers having a construction as described above.

Suitable block copolymers (vinylaromatic block copolymers) thus comprise one or more rubber-like blocks B (soft blocks) and one or more glass-like blocks A (hard blocks). More preferably, at least one synthetic rubber in the pressure-sensitive adhesive of the invention is a block copolymer having an A-B, A-B-A, $(A-B)_3X$ or $(A-B)_4X$ construction, where the above meanings are applicable to A, B and X. Most preferably, all synthetic rubbers in the pressure-sensitive adhesive of the invention are block copolymers having an A-B, A-B-A, $(A-B)_3X$ or $(A-B)_4X$ construction, where the above meanings are applicable to A, B and X. More particularly, the synthetic rubber in the pressure-sensitive adhesive of the invention is a mixture of block copolymers having an A-B, A-B-A, $(A-B)_3X$ or $(A-B)_4X$ structure, preferably comprising at least diblock copolymers A-B and/or triblock copolymers A-B-A.

Also advantageous is a mixture of diblock and triblock copolymers and $(A-B)_n$ or $(A-B)_nX$ block copolymers with n not less than 3.

The pressure-sensitive adhesive compositions employed are preferably those based on block copolymers comprising polymer blocks predominantly formed from vinylaromatics (A blocks), preferably styrene, and those predominantly formed by polymerization of 1,3-dienes (B blocks), for example butadiene and isoprene or a copolymer of the two. The products may also contain partial or complete hydrogenation in the diene block. Block copolymers of vinylaromatics and isobutylene can likewise be utilized in accordance with the invention.

Preferably, the block copolymers of the pressure-sensitive adhesive compositions have polystyrene end blocks.

The block copolymers that result from the A and B blocks may contain identical or different B blocks. The block copolymers may have linear A-B-A structures. It is likewise possible to use block copolymers in radial form and star-shaped and linear multiblock copolymers. Further components present may be A-B diblock copolymers. All the aforementioned polymers can be utilized alone or in a mixture with one another.

Rather than the preferred polystyrene blocks, vinylaromatics used may also be polymer blocks based on other aromatic-containing homo- and copolymers (preferably $C_8$ to $C_{12}$ aromatics) having glass transition temperatures of greater than 75° C., for example α-methylstyrene-containing aromatic blocks. In addition, it is also possible for identical or different A blocks to be present.

Preferably, the vinylaromatics for formation of the A block include styrene, α-methylstyrene and/or other styrene derivatives. The A block may thus be in the form of a homo- or copolymer. More preferably, the A block is a polystyrene.

Preferred conjugated dienes as monomers for the soft block B are especially selected from the group consisting of butadiene, isoprene, ethylbutadiene, phenylbutadiene, piperylene, pentadiene, hexadiene, ethylhexadiene and dimethylbutadiene, and any desired mixtures of these monomers. The B block may also be in the form of a homopolymer or copolymer.

More preferably, the conjugated dienes as monomers for the soft block B are selected from butadiene and isoprene.

For example, the soft block B is a polyisoprene, a polybutadiene or a partly or fully hydrogenated derivative of one of these two polymers, such as polybutylene-butadiene in particular, or a polymer formed from a mixture of butadiene and isoprene. Most preferably, the B block is a polybutadiene.

A blocks are also referred to as "hard blocks" in the context of this invention. B blocks are correspondingly also called "soft blocks" or "elastomer blocks". This is reflected by the inventive selection of the blocks in accordance with their glass transition temperatures (for A blocks at least 25° C., especially at least 50° C., and for B blocks at most 25° C., especially at most −25° C.).

The proportion of the vinylaromatic block copolymers, styrene block copolymers in particular, in one preferred embodiment, in total, based on the overall pressure-sensitive adhesive, is at least 20% by weight, preferably at least 30% by weight, further preferably at least 35% by weight.

Too low a proportion of vinylaromatic block copolymers results in relatively low cohesion of the pressure-sensitive adhesive composition, and so the tensile strength, which is needed for stripping, is too low.

The maximum proportion of the vinylaromatic block copolymers, styrene block copolymers in particular, in total, based on the overall pressure-sensitive adhesive composition, is at most 75% by weight, preferably at most 65% by weight, further preferably at most 55% by weight.

Too high a proportion of vinylaromatic block copolymers in turn results in barely any pressure-sensitive adhesion in the pressure-sensitive adhesive composition.

Accordingly, the proportion of the vinylaromatic block copolymers, styrene block copolymers in particular, in total, based on the overall pressure-sensitive adhesive composition, is at least 20% by weight, more preferably at least 30% by weight, further preferably at least 35% by weight, and simultaneously at most 75% by weight, more preferably at most 65% by weight, most preferably at most 55% by weight.

Pressure-sensitive adhesive compositions (PSAs) of the invention are based in particular on styrene block copolymers. The pressure-sensitive adhesiveness of the polymer mixtures is achieved by addition of tackifying resins which are miscible with the elastomer phase.

Besides the at least one vinylaromatic block copolymer, the PSAs have at least one tackifying resin in order to increase the adhesion in a desired manner. The tackifying resin ought to be compatible with the elastomer block of the block copolymers.

A "tackifying resin", in accordance with the general understanding of the person skilled in the art, is understood to mean an oligomeric or polymeric resin that increases the autohesion (tack, intrinsic tackiness) of the pressure-sensitive adhesive composition compared to the pressure-sensitive adhesive composition that does not contain any tackifying resin but is otherwise identical.

Correspondingly, a selection is made to an extent of at least 75% by weight (based on the total resin content) of a resin having a DACP (diacetone alcohol cloud point) of greater than −20° C., preferably greater than 0° C., and a softening temperature (ring & ball) of not less than 70° C., preferably not less than 100° C.

With particular preference the tackifying resins comprise at least 75 wt % (based on the total resin content) of hydrocarbon resins or terpene resins ora mixture of the same.

It has been found that tackifiers advantageously usable for the PSA composition(s) are, in particular, nonpolar hydrocarbon resins, for example hydrogenated and non-hydrogenated polymers of dicyclopentadiene, non-hydrogenated, partly, selectively or fully hydrogenated hydrocarbon resins based on $C_5$-, $C_5/C_9$- or $C_9$ monomer streams, and polyterpene resins based on α-pinene and/or ß-pinene and/or δ-limonene. Aforesaid tackifying resins can be used either alone or in a mixture. It is possible to use either room temperature solid resins or liquid resins. Tackifying resins, in hydrogenated or non-hydrogenated form, which also contain oxygen may optionally be used preferably up to a maximum proportion of 25%, based on the total amount of the resins, in the adhesive composition.

The proportion of the room temperature liquid resins according to one preferred variant is up to 15% by weight, preferably up to 10% by weight, based on the overall PSA.

The PSA of the invention contains preferably 20% to 60% by weight, based on the total weight of the PSA, of at least one tackifying resin. With particular preference there is 30% to 50% by weight of tackifying resins present, based on the total weight of the PSA.

Further additives that can typically be utilized are:
plasticizers, for example plasticizer oils, or low molecular weight liquid polymers, for example low molecular weight polybutenes,
  preferably with a proportion of 0.2% to 5% by weight, based on the total weight of the PSA,
primary antioxidants, for example sterically hindered phenols,
  preferably with a proportion of 0.2% to 1% by weight, based on the total weight of the PSA,
secondary antioxidants, for example phosphites or thioethers,
  with a proportion of 0.2% to 1% by weight, based on the total weight of the PSA,
process stabilizers, for example carbon radical scavengers,
  preferably with a proportion of 0.2% to 1% by weight, based on the total weight of the PSA,
light stabilizers, for example UV absorbers or sterically hindered amines,
  preferably with a proportion of 0.2% to 1% by weight, based on the total weight of the PSA,
processing auxiliaries,
  preferably with a proportion of 0.2% to 1% by weight, based on the total weight of the PSA,
end block reinforcer resins,
  preferably with a proportion of 0.2% to 10% by weight, based on the total weight of the PSA, and
optionally further polymers that are preferably elastomeric in nature; correspondingly utilizable elastomers include, inter alia, those based on pure hydrocarbons, for example unsaturated polydienes such as natural or synthetically produced polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogenated, acrylated, allyl or vinyl ether-containing polyolefins,
  preferably with a proportion of 0.2% to 10% by weight, based on the total weight of the PSA.

The nature and amount of the blend components can be selected as required.

It is also in accordance with the invention when the adhesive composition does not have some of and preferably any of the admixtures mentioned in each case.

In one embodiment of the present invention, the PSA composition also comprises further additives; nonlimiting examples include crystalline or amorphous oxides, hydroxides, carbonates, nitrides, halides, carbides or mixed oxide/hydroxide/halide compounds of aluminum, of silicon, of zirconium, of titanium, of tin, of zinc, of iron or of the alkali metals/alkaline earth metals. These are essentially aluminas, for example aluminum oxides, boehmite, bayerite, gibbsite, diaspore and the like. Sheet silicates are very particularly suitable, for example bentonite, montmorillonite, hydrotalcite, hectorite, kaolinite, boehmite, mica, vermiculite or mixtures thereof. But it is also possible to use carbon blacks or further polymorphs of carbon, for instance carbon nanotubes.

The adhesive compositions may also be colored with dyes or pigments. The adhesive compositions may be white, black or colored.

The plasticizers metered in may, for example, be (meth) acrylate oligomers, phthalates, cyclohexanedicarboxylic esters, water-soluble plasticizers, plasticizing resins, phosphates or polyphosphates.

The addition of silicas, advantageously of precipitated silica surface-modified with dimethyldichlorosilane, can be utilized in order to adjust the thermal shear strength of the PSA composition.

In a preferred embodiment of the invention, the adhesive composition consists solely of vinylaromatic block copolymers, tackifying resins, microballoons and optionally the abovementioned additives.

Further preferably, the adhesive composition consists of the following composition:

| | |
|---|---|
| vinylaromatic block copolymers | 20% to 75% by weight |
| tackifying resins | 24.6% to 60% by weight |
| microballoons | 0.2% to 10% by weight |
| additives | 0.2% to 10% by weight |

Further preferably, the adhesive composition consists of the following composition:

| | |
|---|---|
| vinylaromatic block copolymers | 35% to 65% by weight |
| tackifying resins | 34.6% to 45% by weight |
| microballoons | 0.2% to 10% by weight |
| additives | 0.2% to 10% by weight |

Further preferably, the adhesive composition consists of the following composition:

| | |
|---|---|
| vinylaromatic block copolymers | 30% to 75% by weight |
| tackifying resins | 24.8% to 60% by weight |
| microballoons | 0.2% to 10% by weight |

The PSA composition of the invention has been foamed. Foaming may be effected by means of any chemical and/or physical methods. Preferably, however, a foamed pressure-sensitive adhesive of the invention is obtained by the introduction and subsequent expansion of microballoons.

"Microballoons" are understood to mean hollow microbeads that are elastic and hence expandable in their ground state, having a thermoplastic polymer shell. These beads have been filled with low-boiling liquids or liquefied gas. Shell material employed is especially polyacrylonitrile, PVDC, PVC or polyacrylates. Suitable low-boiling liquids are especially hydrocarbons from the lower alkanes, for example isobutane or isopentane, that are enclosed in the polymer shell under pressure as liquefied gas.

Action on the microballoons, especially by the action of heat, results in softening of the outer polymer shell. At the same time, the liquid blowing gas present within the shell is converted to its gaseous state. This causes irreversible extension and three-dimensional expansion of the microballoons. The expansion has ended when the internal and external pressure are balanced. Since the polymeric shell is conserved, what is achieved is thus a closed-cell foam.

A multitude of microballoon types is commercially available, which differ essentially in terms of their size (6 to 45 μm diameter in unexpanded state) and the starting temperatures that they require for expansion (75 to 220° C.). One example of commercially available microballoons is the Expancel® DU products (DU=dry unexpanded) from Akzo Nobel.

Unexpanded microballoon types are also available in the form of an aqueous dispersion having a solids/microballoon content of about 40% to 45% by weight, and additionally also in the form of polymer-bound microballoons (masterbatches), for example in ethyl-vinyl acetate with a microballoon concentration of about 65% by weight. Both the microballoon dispersions and the masterbatches, like the DU products, are suitable for production of a foamed PSA composition of the invention.

A foamed PSA composition of the invention can also be produced with what are called pre-expanded microballoons. In the case of this group, the expansion already takes place prior to mixing into the polymer matrix. Pre-expanded microballoons are commercially available, for example, under the Dualite® name or with the product designation Expancel xxx DE (dry expanded) from Akzo Nobel.

Preferred in accordance with the invention is for at least 90% of all cavities formed by microballoons to have a maximum diameter of 10 to 200 μm, more preferably of 15 to 200 μm. The "maximum diameter" refers to the maximum extent of a microballoon in any desired direction in space.

The diameters are determined from a cryofracture edge under the scanning electron microscope (SEM) at 500-times magnification. The diameter of each individual microballoon is determined graphically.

Where foaming takes place by means of microballoons, the microballoons may be supplied as a batch, a paste or an unextended or extended powder to the formulation. They may also be present in suspension in solvent.

The proportion of the microballoons in the adhesive according to one preferred embodiment of the invention is between greater than 0% and 10% by weight, more particularly between 0.25% and 5% by weight, very particularly between 0.5% and 1.5% by weight, based in each case on the overall composition of the adhesive.

The figure is based on unexpanded microballoons.

A polymer composition of the invention, comprising expandable hollow microbeads, may additionally also contain non-expandable hollow microbeads. What is crucial is merely that virtually all gas-containing caverns are closed by a permanently impervious membrane, no matter whether this membrane consists of an elastic and thermoplastically extensible polymer mixture or, for instance, of elastic and—within the spectrum of the temperatures possible in plastics processing—non-thermoplastic glass.

Also suitable for the PSA composition of the invention—selected independently of other additives—are solid polymer beads, hollow glass beads, solid glass beads, hollow ceramic beads, solid ceramic beads and/or solid carbon beads ("carbon microballoons").

The absolute density of a foamed PSA composition of the invention is preferably 350 to 990 kg/m$^3$, more preferably 450 to 970 kg/m$^3$, more especially 500 to 900 kg/m$^3$. The relative density describes the ratio of the density of the foamed PSA composition of the invention to the density of the unfoamed PSA composition of the invention having an identical formulation. The relative density of a PSA composition of the invention is preferably 0.35 to 0.99, more preferably 0.45 to 0.97, especially 0.50 to 0.90.

If the PSA of the invention has been applied to a carrier (on one or both sides), the absolute density of the foamed PSA composition of the invention is preferably between 220 to 990 kg/m$^3$, more preferably 300 to 900 kg/m$^3$, more particularly 500 to 850 kg/m$^3$. The relative density is in that case preferably between 0.20 to 0.99, more preferably between 0.30 to 0.90, more particularly between 0.50 to 0.85.

Adhesive tapes produced using the polymer foam of the invention can be designed as

- single-layer, double-sidedly self-adhesive tapes—known as "transfer tapes"—composed of a single layer of a foamed self-adhesive composition;
- single-sidedly self-adhesively furnished adhesive tapes—hereinafter "single-sided self-adhesive tapes"—in which the layer of self-adhesive composition is a layer of the adhesive tape of the invention;
- double-sidedly self-adhesively furnished adhesive tapes—hereinafter "double-sided self-adhesive tapes"—in which one and, in particular, both layers of self-adhesive composition of the invention is or are a layer of the adhesive tape, examples being two-layer systems composed of a foamed self-adhesive composition and an unfoamed self-adhesive composition;
- double-sidedly self-adhesively furnished adhesive tapes with a carrier layer both sides of which bear applied adhesive compositions, of which at least one is a composition according to the invention.

The double-sided products here, regardless of whether they are intended for bonding or for sealing, may have a symmetrical or an asymmetrical construction.

According to one advantageous embodiment of the invention, a carrier is furnished on both sides with one layer of adhesive composition in each case, with preferably the second layer of adhesive composition likewise being constructed on the basis of vinylaromatic block copolymers and tackifying resins.

With further preference, the first and second layers of adhesive have an identical composition.

In one preferred embodiment of the adhesive film strip, the carrier consists only of a single layer.

Encompassed by the concept of the invention are constructions having an extensible carrier in the middle of the adhesive strip conceivable, in which case the extensibility of the carrier must be sufficient to ensure detachment of the adhesive strip by extensive stretching. Examples of possible carriers include highly extensible films. Examples of extensible carriers which can be used advantageously are transparent embodiments from WO 2011/124782 A1, DE 10 2012 223 670 A1, WO 2009/114683 A1, WO 2010/077541 A1, WO 2010/078396 A1.

The carrier film is produced using film-forming or extrudable polymers, which may additionally have undergone monoaxial or biaxial orientation.

In one preferred version, polyolefins are used. Preferred polyolefins are prepared from ethylene, propylene, butylene and/or hexylene, and in each case the pure monomers may be polymerized or else mixtures of the stated monomers may be copolymerized. Through the polymerization technique and through the selection of the monomers it is possible to direct the physical and mechanical properties of the polymer film, such as the softening temperature and/or the tensile strength, for example.

Polyurethanes, furthermore, may be used advantageously as starting materials for extensible carrier layers. Polyurethanes are chemically and/or physically crosslinked polycondensates, typically constructed from polyols and isocyanates. Depending on the nature of and proportion in which the individual components are used, extensible materials are obtainable which can be used advantageously in the context of this invention. Raw materials available to the formulator for this purpose are identified for example in EP 0 894 841 B1 and EP 1 308 492 B1. The skilled person is aware of further raw materials from which carrier layers of the invention can be constructed. It is advantageous, furthermore, to use rubber-based materials in carrier layers in order to produce extensibility. As rubber or synthetic rubber or blends produced therefrom, as starting material for extensible carrier layers, the natural rubber may be selected fundamentally from all available grades such as, for example, crepe, RSS, ADS, TSR or CV products, depending on the required levels of purity and viscosity, and the synthetic rubber or rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof.

Employable with particular advantage as materials for extensible carrier layers are block copolymers. In these polymers, individual polymer blocks are linked covalently to one another. Block linkage may be in a linear form, or else in a star-shaped or graft copolymer variant. One example of an advantageously employable block copolymer is a linear triblock copolymer whose two terminal blocks have a softening temperature of at least 40° C., preferably at least 70° C., and whose middle block has a softening temperature of not more than 0° C., preferably not more than −30° C. Higher block copolymers, such as tetrablock copolymers, may likewise be employed. It is important that at least two polymer blocks of same or different kind are present in the block copolymer and have a softening temperature in each case of at least 40° C., preferably at least 70° C., being separated from one another in the polymer chain by at least one polymer block having a softening temperature of not more than 0° C., preferably not more than −30° C. Examples of polymer blocks are polyethers such as, for example, polyethylene glycol, polypropylene glycol or polytetrahydrofuran, polydienes, such as, for example, polybutadiene or polyisoprene, hydrogenated polydienes, such as, for example, polyethylene-butylene or polyethylene-propylene, polyesters, such as, for example, polyethylene terephthalate, polybutanedioladipate or polyhexanedioladipate, polycarbonate, polycaprolactone, polymer blocks of vinylaromatic monomers, such as, for example, polystyrene or poly-[α]-methylstyrene, polyalkyl vinyl ethers, polyvinyl acetate, polymer blocks of [α],[β]-unsaturated esters such as, in particular, acrylates or methacrylates. The skilled person is aware of corresponding softening temperatures. Alternatively the skilled person looks up such temperatures for example in the Polymer Handbook [J. Brandrup, E. H. Immergut, E. A. Grulke (Eds.), Polymer Handbook, 4th edn. 1999, Wiley, New York]. Polymer blocks may be constructed from copolymers.

In order to produce a carrier material it may also be appropriate here to add additives and further components which enhance the film-forming properties, which reduce the tendency for crystalline segments to form and/or which specifically improve mechanical properties or else, where appropriate, impair such properties.

Additionally suitable are foam materials in web form (made from polyethylene and polyurethane, for example).

The carriers may have a multi-ply design.

Furthermore, the carriers may have outer layers, barrier layers for example, which prevent penetration of components from the adhesive into the carrier or vice-versa. These outer layers may also have barrier properties so as to prevent diffusion of water vapor and/or oxygen through the layer.

For more effective anchorage of the PSAs on the carrier, the carriers may be pretreated by the known measures such as corona, plasma or flaming. Also possible is the use of a primer. Ideally, however, a pretreatment can be omitted.

The reverse of the carrier may be subjected to an anti-adhesive physical treatment or coating.

Lastly, the carrier material in web form may be a material which is anti-adhesively coated on both sides, such as a release paper or a release film, also called liner, and specifically as a temporary carrier.

A liner (release paper, release film) is not part of an adhesive tape but instead only an aid to the production or storage thereof or an aid to further processing by diecutting. Furthermore, in contrast to an adhesive tape carrier, a liner is not firmly joined to a layer of adhesive.

The thickness of the carrier layer is in the range from 10 to 200 µm, preferably between 20 and 100 µm.

The stress at 50% elongation ought to be less than 20 N/cm, preferably less than 10 N/cm, in order to enable simple detachment without excessive application of force.

Particularly advantageous is an adhesive film strip consisting of
- a single-layer carrier, preferably a polyurethane, with the carrier having an elongation at break of at least 100%, preferably 300%, and optionally a resilience of more than 50%, where
- a layer of adhesive is applied to each of both sides of the carrier, this layer being composed of the adhesive of the invention, which is constructed on the basis of vinylaromatic block copolymers and tackifying resins, and the composition of the adhesives being more preferably identical.

The production and processing of the PSAs may take place either from solution or from the melt. Application of the PSAs to the carrier layer may take place by direct coating or by lamination, more particularly hot lamination.

Typical processed forms of the pressure-sensitive adhesive strips of the invention are adhesive tape rolls and also adhesive strips of the kind obtained, for example, in the form of diecuts.

All of the layers preferably have the form, essentially, of a cuboid. With further preference all the layers are joined to one another over their full area.

Optionally there may be a non-adhesive grip tab region provided, starting from which the detachment operation can be performed.

The general expression "adhesive tape" for the purposes of this invention encompasses all sheetlike structures such as two-dimensionally extended films or film sections, tapes with extended length and limited width, tape sections, diecuts, labels, and the like.

The (single-layer) adhesive film strip preferably has a thickness of 20 µm to 2000 µm, more preferably of 30 to 1000 µm, with particular preference 50 to 60 µm or 100 µm or 150 µm or 300 µm.

In a preferred embodiment of the pressure-sensitive adhesive strip, the carrier has a thickness of between 20 and 60 µm, preferably 50 µm, and the identical layers of adhesive on the carrier likewise each have a thickness of between 20 and 60 µm, preferably 50 µm.

Particular preference is given here to two embodiments, the first having 25 µm of adhesive on either side of a 50 µm carrier, and the second having 35 µm of adhesive on either side of a 30 µm carrier.

With reference to the figures and examples described hereinafter, particularly advantageous embodiments of the invention will be elucidated in detail, without any intention thereby to subject the invention to unnecessary restriction.

BRIEF DESCRIPTION OF THE DISCLOSURE

Figure 1:
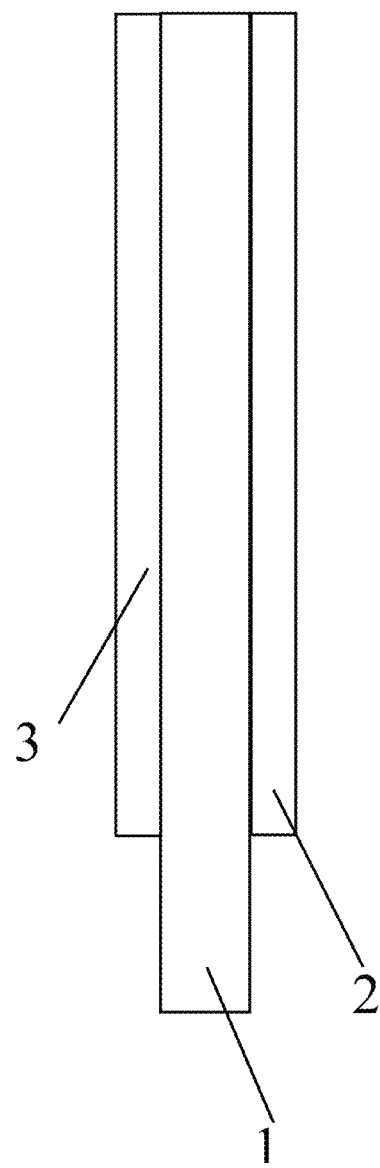
FIG. 1 shows a three-layer pressure-sensitive adhesive strip of the invention.

FIG. 1 shows the pressure-sensitive adhesive strip of the invention composed of three layers 1, 2, 3, which is redetachable without residue or destruction by extensive stretching substantially within the bond plane.

The strip consists of a carrier 1, the carrier 1 being of one-layer embodiment.

On the carrier there are external inventive adhesive layers 2, 3 on either side.

The protruding end of the carrier 1 may serve as a grip tab, but is not mandatorily present.

Figure 2:
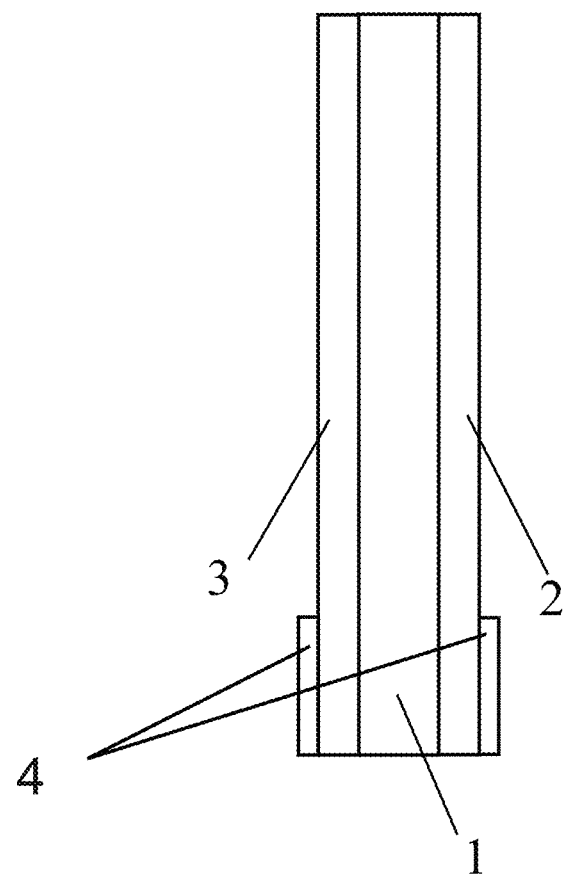
FIG. 2 shows a three-layer pressure-sensitive adhesive strip of the invention in an alternative embodiment.

In FIG. 2, the pressure-sensitive adhesive strip of the invention is shown in a variant. The strip consists of three layers 1, 2, 3 which are arranged congruently one above another.

In order to produce a grip tab for pulling, to achieve the extensive stretching particularly in the bond plane, one end of the adhesive film strip is made non-adhesive on both sides, by the application of preferably siliconized pieces of film or of paper 4.

Figure 3:
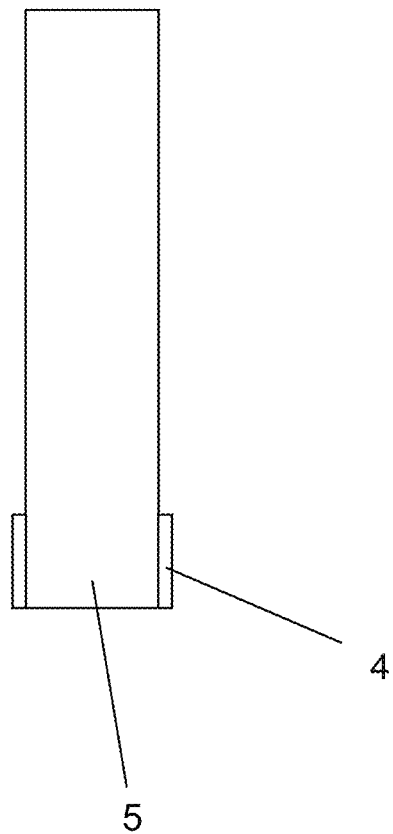
FIG. 3 shows a one-layer pressure-sensitive adhesive strip of the invention.

FIG. 3 shows a single-layer pressure-sensitive adhesive strip 5 which has a grip tab composed of siliconized film or paper pieces 4 applied to both sides of the adhesive strip 5.

Figure 4:
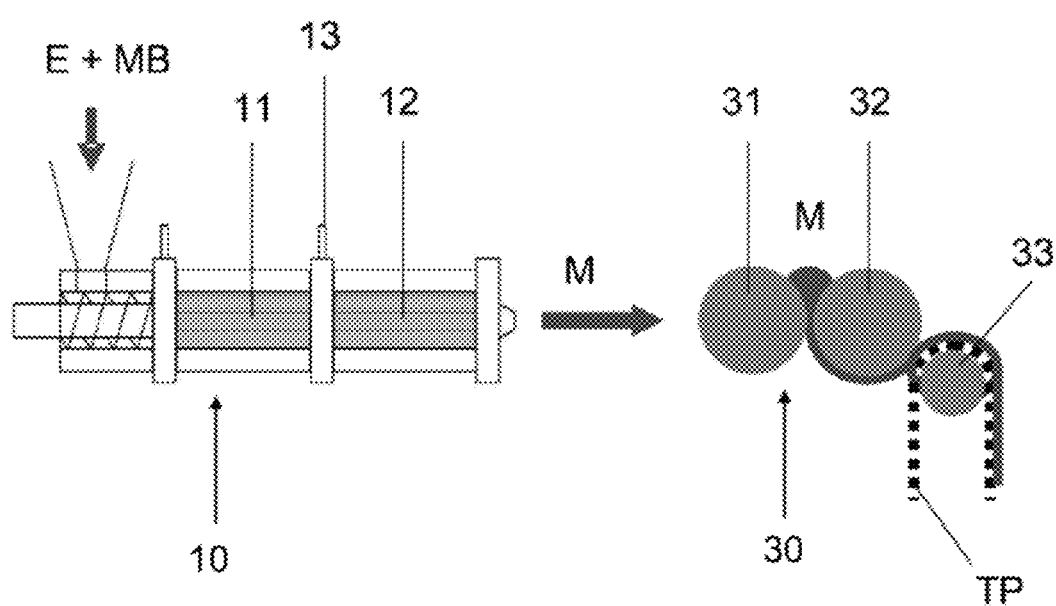
FIG. 4 the process with one mixing unit, wherein the microballoons are added directly in the first mixing unit.

Furthermore, the invention encompasses a method for producing an adhesive of the invention which comprises expanded microballoons—see FIG. 4—wherein
the constituents for forming the adhesive such as polymers, resins or fillers and unexpanded microballoons are mixed in a first mixing unit and heated to expansion temperature under elevated pressure, the microballoons are expanded on exit from the mixing unit, the adhesive composition mixture along with the expanded microballoons is formed into a layer in a roll applicator, the adhesive composition mixture along with the expanded microballoons is optionally applied to a carrier or release material in web form.

Furthermore, the invention encompasses a method for producing an adhesive of the invention which comprises expanded microballoons—see FIG. 5—wherein the constituents for forming the adhesive such as polymers, resins or fillers and unexpanded microballoons are mixed in a first mixing unit under elevated pressure and are heated to a temperature below the expansion temperature of the microballoons, the mixed, more particularly homogeneous adhesive is transferred from the first mixing unit into a second unit and is heated to expansion temperature under elevated temperature, the microballoons are expanded in the second unit or on exit from the second unit, the adhesive composition mixture along with the expanded microballoons is formed into a layer in a roll applicator, the adhesive composition mixture along with the expanded microballoons is optionally applied to a carrier or release material in web form.

Figure 6:
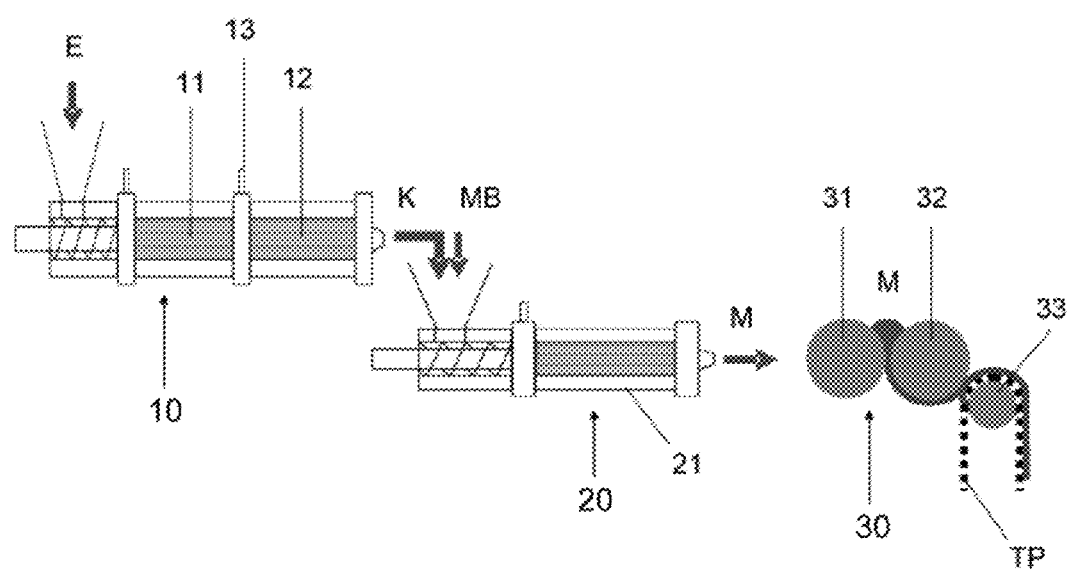
FIG. 6 the process with two mixing units, wherein the microballoons are added only in the second mixing unit.

Furthermore, the invention encompasses a method for producing an adhesive of the invention which comprises expanded microballoons—see FIG. 6—wherein the constituents for forming the adhesive such as polymers, resins or fillers are mixed in a first mixing unit, the mixed, more particularly homogeneous adhesive is transferred from the first mixing unit into a second mixing unit, which is supplied simultaneously with the unexpanded microballoons, the microballoons are expanded in the second mixing unit or on exit from the second mixing unit, the adhesive composition mixture along with the expanded microballoons is formed into a layer in a roll applicator, the adhesive composition mixture along with the expanded microballoons is optionally applied to a carrier or release material in web form.

According to one preferred embodiment of the invention, the adhesive is shaped in a roll applicator and applied to the carrier material.

There is generally no need to degas compositions foamed microballoons prior to coating in order to obtain a homogeneous, continuous coating. The expanded microballoons displace the air incorporated into the adhesive composition during compounding. In the case of high throughputs, it is nevertheless advisable to degas the compositions prior to coating in order to obtain a homogeneous feed of composition in the roll gap. The degassing is ideally effected directly upstream of the roll applicator at mixing temperature and with a pressure differential from ambient pressure of at least 200 mbar.

In addition, it is advantageous when the first mixing unit is a continuous unit, especially a planetary roller extruder, a twin-screw extruder or a pin extruder, the first mixing unit is a batchwise unit, especially a Z kneader or an internal mixer, the second mixing unit is a planetary roll extruder, a single-screw or twin-screw extruder or a pin extruder and/or the shaping unit in which the adhesive composition along with the expanded microballoons is shaped to give a carrier layer is a calender, a roll applicator or a gap formed by a roll and a fixed doctor.

With the processes of the invention, solvent-free processing of all previously known components of adhesive compositions and those described in the literature, especially self-adhesive compositions, is possible.

The above-described processes within the concept of the invention in variants of particularly excellent configuration are illustrated hereinafter, without any intention to impose unnecessary restriction through the choice of the figures depicted.

FIG. 4 shows a particularly advantageously configured process for producing a foamed pressure-sensitive self-adhesive tape.

In a continuous mixing unit, for example a planetary roller extruder (PRE), a (self-) adhesive composition is produced.

For this purpose, the reactants E that are to form the adhesive composition are introduced into the planetary roller extruder or PRE 10. At the same time, the unexpanded microballoons MB are incorporated homogeneously under elevated pressure into the self-adhesive composition during the compounding process.

The temperatures required for homogeneous production of the self-adhesive composition and for expansion of the microballoons are adjusted with respect to one another such that the microballoons foam up in the foam-like and/or self-adhesive composition M (hereinafter "the adhesive composition M") on exit from the PRE 10 as a result of the pressure drop on exit from the die, and in so doing break through the surface of the composition.

With a roll applicator 30 as shaping unit, the adhesive composition M is calendered and coated onto a carrier material in web form, for example release paper TP; in some cases, further foaming can still take place in the roll gap. The roll applicator 30 consists of a doctor roll 31 and a coating roll 32. The release paper TP is guided onto the latter via a pick-up roll 33, such that the release paper TP takes up the adhesive composition M from the coating roll 32.

At the same time, the expanded microballoons are forced back into the polymer matrix of the adhesive composition M, and hence a smooth surface is generated.

Figure 5:
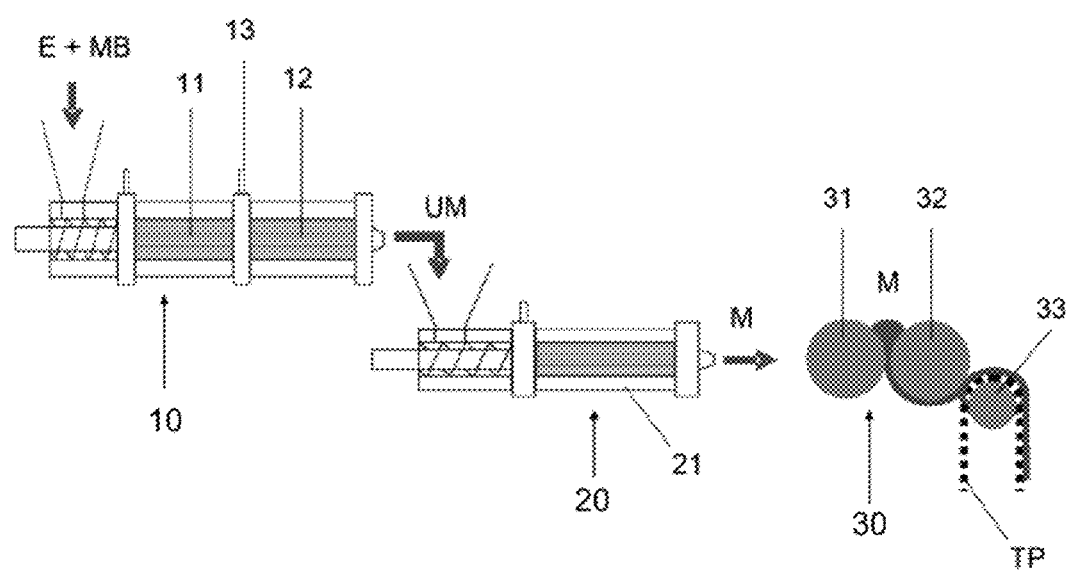
FIG. 5 the process with two mixing units, wherein the microballoons are added in the first mixing unit.

FIG. 5 shows a further particularly advantageously configured process for producing a foamed pressure-sensitive self-adhesive tape.

The planetary roller extruder PRE 10 has two successive mixing zones 11, 12 in which a central spindle rotates. In addition, there are six planetary spindles per heating zone. Further reactants are added to the injection ring 13, for example plasticizer or liquid resin. An example of a suitable apparatus is the planetary roller extruder from Entex in Bochum.

Subsequently, the microballoons are incorporated under elevated pressure homogeneously into the self-adhesive composition in a second mixing unit, for example a single-screw extruder, heated above the expansion temperature and foamed on exit. For this purpose, the adhesive composition M formed from the reactants E is introduced here into the single-screw extruder SSE 20; at the same time, the unexpended microballoons UM are introduced. The single-screw extruder SSE 20 has a total of four heating zones over its run length 21.

An example of a suitable apparatus is a single-screw extruder from Kiener.

During the expansion caused by the pressure drop at the die exit of SSE 20, the microballoons break through the surface of the composition.

With a roll applicator 30, the adhesive composition M is calendered and coated onto a carrier material in web form, for example release paper TP; in some cases, further foaming can still take place in the roll gap. The roll applicator 30 consists of a doctor roll 31 and a coating roll 32. The release paper TP is guided onto the latter via a pick-up roll 33, such that the release paper TP takes up the adhesive composition M from the coating roll 32.

At the same time, the expanded microballoons are forced back into the polymer matrix of the adhesive composition M, and hence a smooth surface is generated.

FIG. 6 shows a further particularly advantageously configured process for producing a foamed pressure-sensitive self-adhesive tape.

In a continuous mixing unit, for example a planetary roller extruder (PRE), a (self-) adhesive composition is produced.

Here, the reactants E that are to form the adhesive composition M are introduced into the planetary roller extruder PRE 10. The planetary roller extruder PRE 10 has two successive mixing zones 11, 12 in which a central spindle rotates. In addition, there are six (6) planetary spindles per heating zone.

Further reactants are added to the injection ring 13, for example plasticizer or liquid resin.

An example of a suitable apparatus is the planetary roller extruder from Entex in Bochum.

Subsequently, the microballoons MB are incorporated homogeneously under elevated pressure into the self-adhesive composition in a second mixing unit, for example a single-screw extruder, heated above the expansion temperature and foamed on exit.

For this purpose, an intermediate adhesive composition K formed from the reactants E is introduced here into the single-screw extruder SSE 20; at the same time, the microballoons MB are introduced. The single-screw extruder SSE has a total of four heating zones over its run length 21.

An example of a suitable apparatus is a single-screw extruder from Kiener.

During the expansion caused by the pressure drop at the die exit of SSE 20, the microballoons break through the surface of the composition.

With a roll applicator 30, this foam-like adhesive composition M is calendered and coated onto a carrier material in web form, for example release paper TP; in some cases, further foaming can still take place in the roll gap. The roll applicator 30 consists of a doctor roll 31 and a coating roll 32. The release paper TP is guided onto the latter via a pick-up roll 33, such that the release paper TP takes up the adhesive composition M from the coating roll 32.

At the same time, the expanded microballoons are forced back into the polymer matrix of the adhesive composition M, and hence a smooth surface is generated.

With falling gap pressure in the roll gap, there is a decrease in the bonding areas of the coated foamed self-adhesive compositions, since the microballoons are then forced back to a lesser degree, as can be inferred from FIG. 4. FIG. 4 shows the bonding areas as a function of the coating process or parameter. The gap pressure required is highly dependent on the composition system used; the higher the viscosity, the greater the gap pressure should be, depending on the layer thickness desired and the coating speed chosen. In practice, a gap pressure of greater than 4 N/mm has been found to be useful; with exceptionally high coating speeds greater than 50 m/min, with low applications of composition (basis weights less than 70 g/m$^2$) and high-viscosity compositions (50 000 Pa*s at 0.1 rad and 110° C.), gap pressures greater than 50 N/mm may even be required.

It has been found to be useful to adjust the temperature of the rolls to the expansion temperature of the microballoons. Ideally, the roll temperature of the first rolls is above the expansion temperature of the microballoons in order to enable further foaming of the microballoons without destroying them. The last roll should have a temperature equal to or below the expansion temperature in order that the microballoon shell can solidify and the smooth surface of the invention forms.

Many units for continuous production and processing of solvent-free polymer systems are known. Usually, screw machines such as single-screw and twin-screw extruders of different processing lengths and with different equipment are used. Alternatively, continuous kneaders of a wide variety of different designs, for example including combinations of kneaders and screw machines, or else planetary roller extruders, are used for this task.

Planetary roller extruders have been known for some time and were first used in the processing of thermoplastics, for example PVC, where they were used mainly for charging of the downstream units, for example calenders or roll systems. Their advantage of high surface renewal for material and heat exchange, with which the energy introduced via friction can be removed rapidly and effectively, and of short residence time and narrow residence time spectrum, has allowed their field of use to be broadened recently, inter alia, to embrace compounding processes that require a mode of operation with exceptional temperature control.

Planetary roller extruders exist in various designs and sizes according to the manufacturer. According to the desired throughput, the diameters of the roller cylinders are typically between 70 mm and 400 mm.

Planetary roller extruders generally have a filling section and a compounding section. The filling section consists of a conveying screw, into which all solid components are metered continuously. The conveying screw then transfers the material to the compounding section. The region of the filling section with the screw is preferably cooled in order to avoid caking of material on the screw. But there are also embodiments without a screw section, in which the material is applied directly between central and planetary spindles. However, this is of no significance for the efficacy of the process of the invention.

The compounding section consists of a driven central spindle and several planetary spindles that rotate around the central spindle within one or more roll cylinders having internal helical gearing. The speed of the central spindle and hence the peripheral velocity of the planetary spindles can be varied and is thus an important parameter for control of the compounding process.

The materials are circulated between the central and planetary spindles, i.e. between planetary spindles and the helical gearing of the roll section, such that the materials can be dispersed under the influence of shear energy and external temperature control to give a homogeneous compound.

The number of planetary spindles that rotate in each roll cylinder can be varied and hence adapted to the demands of the process. The number of spindles affects the free volume within the planetary roller extruder and the residence time of the material in the process, and additionally determines the size of the area for heat and material exchange. The number of planetary spindles affects the compounding outcome via the shear energy introduced. Given a constant roller cylinder diameter, it is possible with a greater number of spindles to achieve better homogenization and dispersion performance, or a greater product throughput.

The maximum number of planetary spindles that can be installed between the central spindle and roller cylinder is dependent on the diameter of the roller cylinder and on the diameter of the planetary spindles used. In the case of use of greater roller diameters as necessary for achievement of throughputs on the production scale, or smaller diameters for the planetary spindles, the roller cylinders can be equipped with a greater number of planetary spindles. Typically, up to seven planetary spindles are used in the case of a roller diameter of D=70 mm, while ten planetary spindles, for example, can be used in the case of a roller diameter of D=200 mm, and 24, for example, in the case of a roller diameter of D=400 mm.

It is proposed in accordance with the invention that the coating of the foamed adhesive compositions be conducted in a solvent-free manner with a multiroll applicator system. These may be applicator systems consisting of at least two rolls with at least one roll gap up to five rolls with three roll gaps.

Also conceivable are coating systems such as calenders (I,F,L calenders), such that the foamed adhesive composition is shaped to the desired thickness as it passes through one or more roll gaps.

It has been found to be particularly advantageous to choose the temperature regime for the individual rolls such that controlled further foaming can take place if appropriate, in such a way that transferring rolls can have a temperature above or equal to the foaming temperature of the microballoon type chosen, whereas receiving rolls should have a temperature below or equal to the foaming temperature in order to prevent uncontrolled foaming and where all rolls can be set individually to temperatures of 30 to 220° C.

In order to improve the transfer characteristics of the shaped composition layer from one roll to another, it is also possible to use anti-adhesively finished rolls or patterned rolls. In order to produce a sufficiently precisely shaped adhesive film, the peripheral speeds of the rolls may have differences.

The preferred 4-roll applicator is formed by a metering roll, a doctor roll, which determines the thickness of the layer on the carrier material and is arranged parallel to the metering roll, and a transfer roll disposed beneath the metering roll. At the lay-on roll, which together with the transfer roll forms a second roll gap, the composition and the material in web form are brought together.

Depending on the nature of the carrier material in web form which is to be coated, coating can be effected in a co-rotational or counter-rotational process.

The shaping system may also be formed by a gap formed between a roll and a fixed doctor. The fixed doctor may be a knife-type doctor or else a stationary (half-)roll.

In an alternative process for producing an adhesive composition, all constituents of said composition are dissolved in a solvent mixture (benzine/toluene/acetone). The microballoons are converted to a slurry in benzine and stirred into the dissolved adhesive composition. As soon as the microballoons are distributed homogeneously in the solution, the adhesive composition can be coated; for example, the coating can be accomplished by means of a doctor blade onto a conventional PET liner.

In the first step, the coated adhesive is dried exposed at 100° C. for 15 min. After the drying, the adhesive layer is covered with a second ply of PET liner and foamed in the oven at 150° C. for 5 min, specifically covered between two liners, in order to produce a particularly smooth surface.

The surface thus produced has a roughness $R_a$ of less than 15 μm, more preferably less than 10 μm.

The surface roughness is preferably $R_a$ is a unit for the industrial standard for the quality of the final surface processing and constitutes the average height of the roughness, especially the average absolute distance from the center line of the roughness profile within the range of evaluation. $R_a$ is measured by means of laser triangulation.

The expansion temperature is usually always higher than the drying temperature.

Figure 7:
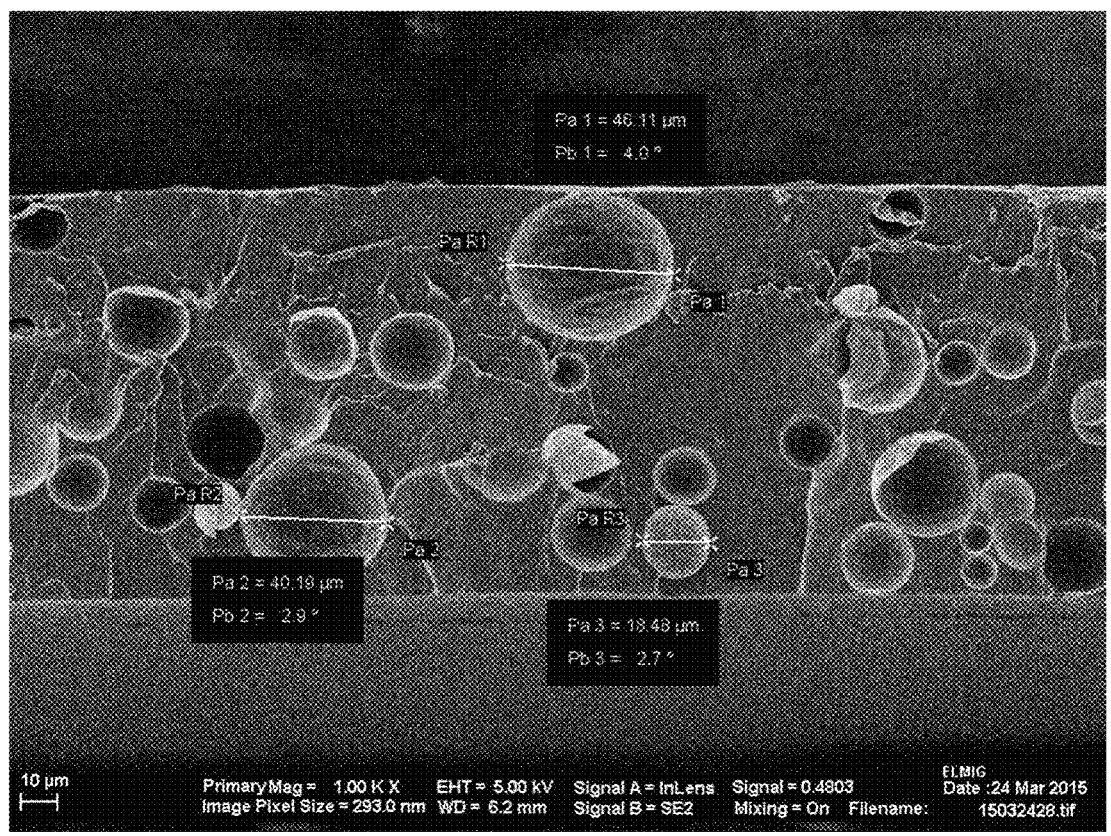
FIG. 7 shows a lateral section through a specimen according to example 5.
Figure 8:
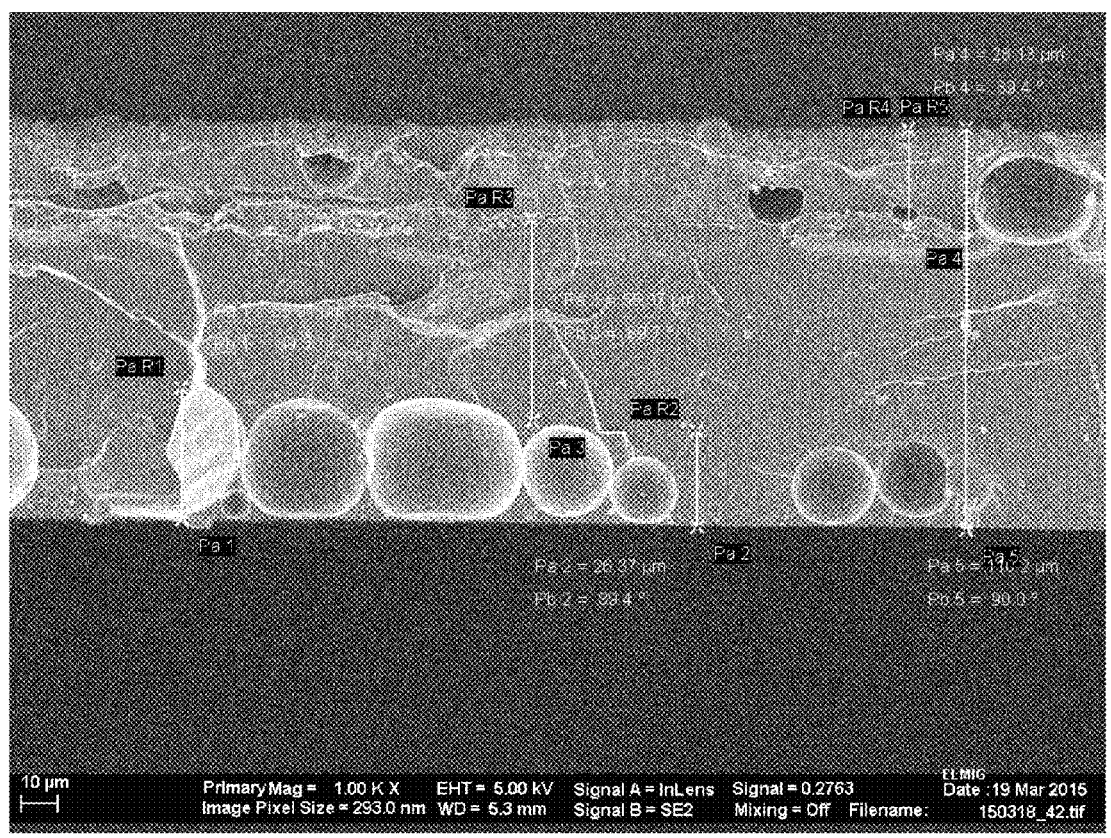
FIG. 8 shows a lateral section through a specimen according to example 8.

FIGS. 7 and 8 show an adhesive composition of the invention in lateral section.

As a result of the foaming of the adhesive composition, technical bonding and performance properties are improved.

This reduction in the drop in peel adhesion is promoted by the high surface quality, produced as a result of the pressing of the expanded microballoons back into the polymer matrix during the coating operation.

Furthermore, relative to the unfoamed composition with the same polymer basis, the foamed self-adhesive composition gains additional performance features such as, for example, an improved impact resistance at low temperatures, boosted peel adhesion on rough substrates, greater damping and/or sealing properties, or conformance of the foam adhesive to uneven substrates, a more favorable crushing/hardness behavior, and enhanced compression capacity.

Further elucidation of the characteristic properties and additional functions of the self-adhesive compositions of the invention is accomplished in part in the examples.

The invention is elucidated in more detail below by means of a number of examples.

In these examples, the constituents of the PSAs were dissolved at 40% in benzine/toluene/acetone, admixed with a benzine slurry of the microballoons, and coated out in the desired film thickness, using a coating bar, onto a PET film equipped with a silicone release, followed by evaporation of the solvent at 100° C. for 15 min so as to dry the layer of composition.

After drying, the adhesive layer was lined with a second ply of PET liner, free from any air inclusions, and was foamed in an oven between the two liners at 150° C. for 5 min. By foaming between two liners, products are obtainable that have particularly smooth surfaces. All of the examples given feature an RA value of less than 15 μm.

Pressure-sensitive adhesive strips with the desired dimensions were obtained by diecutting.

EXAMPLES

Examples 1 to 3

| Raw material | Comparative example Fraction (wt %) | Example 1 Fraction (wt %) | Example 2 Fraction (wt %) | Example 3 Fraction (wt %) |
|---|---|---|---|---|
| KRATON 1102 | 50 | 48.6 | 48.1 | 47.40 |
| Dercolyte A115 | 45 | 46.4 | 46.0 | 45.5 |
| Wingtack 10 | 4.5 | 3.0 | 2.9 | 2.9 |
| Aging inhibitor | 0.5 | 0.5 | 0.5 | 0.5 |
| Expancel 920 DU20 | 0 | 1.5 | 2.5 | 3.5 |
| Total | 100.00 | 100.0 | 100.0 | 100.0 |

Constituents of the Adhesive:

| | |
|---|---|
| KRATON 1102 | styrene-butadiene-styrene block copolymer from Kraton polymers, 83 wt % 3-block, 17 wt % 2-block; block polystyrene content: 30 wt % |
| Dercolyte A 115 | solid α-pinene tackifying resin having a ring and ball softening temperature of 115° C. and a DACP of 35° C. |
| Wingtack 10 | liquid hydrocarbon resin from Cray Valley |
| Expancel 920 DU20 | microballoons |

Aging inhibitors used include Irganox 1010 (phenolic antioxidant).

| | | Comparative example | Example 1 | Example 2 | Example 3 |
|---|---|---|---|---|---|
| Thickness | [μm] | 109 | 107 | 103 | 109 |
| Density | [g/cm³] | 1 | 0.752 | 0.593 | 0.50 |
| Microballoon | [wt %] | | 1.5 | 2.5 | 3.5 |
| Peel adhesion, steel | [N/cm] | 9 | 10.0 | 8.5 | 8.0 |
| Peel adhesion, PE | [N/cm] | 7 | 6.9 | 6.7 | 6.2 |
| Ball drop, (13.8 g) | [cm] | 50 | 225 | >245 | |
| Ball drop, (32.6 g) | [cm] | — | | 125 | 185* |
| Transverse impact toughness | [mJ] | 364 | 656 | 542 | 420 |
| Elongation at break | [%] | 975 | about 1000 | 836 | 631 |
| Detachment force | [N/cm] | 3 | 2.4 | 2.2 | |

Examples 1 to 3 show the effect exerted by an increasing amount of microballoons in the adhesive, as compared with an unfoamed adhesive of equal thickness.
Result:
Shock exposure in the z-plane increases with increasing microballoon content (ball drop)
Shock exposure in the x,y-plane increases with increasing content of microballoons, with a maximum observable at a microballoon content of 1.5 wt % (transverse impact toughness)
The detachment force falls with increasing microballoon content, in spite of increasing shock robustness Examples 4 to 7

| Raw material | Comparative example 2 Fraction (wt %) | Example 4 Fraction (wt %) | Example 5 Fraction (wt %) | Example 6 Fraction (wt %) | Example 7 Fraction (wt %) |
|---|---|---|---|---|---|
| KRATON 1102 | 50 | 49.1 | 48.8 | 48.6 | 48.3 |
| Dercolyte A115 | 44 | 46.2 | 45.9 | 45.7 | 45.5 |
| Wingtack 10 | 4.5 | 3.0 | 3.0 | 3.0 | 3.0 |
| Aging inhibitor | 1.5 | 1.2 | 1.3 | 1.2 | 1.2 |
| Expancel 920 DU20 | 0 | 0.5 | 1 | 1.5 | 2 |
| Total | 100.00 | 100.0 | 100.0 | 100.0 | 100.0 |

| | Microballoon content (wt %) | Density (kg/m³) | Ball weight (g) | Height (cm) | E (J) |
|---|---|---|---|---|---|
| Comparative example | 0 | 1000 | 32.6 | 25 | 0.9005 |
| Example 4 | 0.5 | 884 | 32.6 | 85 | 1.1124 |
| Example 5 | 1 | 799 | 32.6 | 165 | 1.2272 |
| Example 6 | 1.5 | 698 | 32.6 | 250 | 1.2714 |
| Example 7 | 2 | 624 | 110 | 85 | 1.0948 |

| | | | Stripping force | |
|---|---|---|---|---|
| | Microballoon content (wt %) | Density (kg/m³) | F average (N/cm) | F max (N/cm) |
| Comparative example | 0 | 1000 | 2.17 | 2.52 |
| Example 4 | 0.5 | 884 | 2.08 | 2.31 |
| Example 5 | 1 | 799 | 1.94 | 2.10 |
| Example 6 | 1.5 | 698 | 2.04 | 2.19 |
| Example 7 | 2 | 624 | 1.39 | 1.98 |

Examples 4 to 7 show the influence exerted by an increasing microballoon content in the adhesive, by comparison with an unfoamed adhesive.
Result:
Even at a microballoon content of 0.5 wt % there is a distinct improvement measurable in the shock robustness (ball drop)
Shock robustness increases with increasing microballoon content
Stripping force falls with increasing microballoon content Examples 8 to 9

In examples 8 and 9, three-layer specimens were compared with one another. Comparative example 2 consists of a 50 μm PU film as intermediate carrier, to which on both sides an unfoamed adhesive is applied, with the composition indicated, in each case with a coat weight of 25 g/m² and a layer thickness of 25 μm on either side.

Example 8 consists of a 50 μm PU film as intermediate carrier, to which on both sides an unfoamed adhesive of the composition specified is applied, in each case with a coat weight thickness of 20 g/m² and a layer thickness of 20 μm on either side. The specimen, lined on either side with PET liner, was foamed in an oven at 150° C. for 5 min to a total thickness of 100 μm.

Example 9 consists of a 30 μm PU film as intermediate carrier, to which on both sides an unfoamed adhesive of the composition specified is applied, in each case with a coat weight thickness of 28 g/m² and a layer thickness of 28 μm on either side. The specimen, lined on either side with PET liner, was foamed in an oven at 150° C. for 5 min to a total thickness of 100 μm.

| Raw material | Comparative example 2 Fraction (wt %) | Examples 8 and 9 Fraction (wt %) |
|---|---|---|
| KRATON 1102 | 50 | 48.6 |
| Dercolyte A115 | 44 | 45.7 |
| Wingtack 10 | 4.5 | 3.0 |
| Aging inhibitor | 1.5 | 1.2 |
| Expancel 920 DU20 | 0 | 1.5 |
| Total | 100.00 | 100.0 |

|  | Comparative example 2 | Example 8 | Example 9 |
|---|---|---|---|
| Ball drop [cm] 13.8 g | 45 | 245 | 245 |
| Ball drop [mJ] 13.8 g | 60.92 | 331.68 | 331.68 |
| Ball drop [cm] 32.6 g | — | 145 | 145 |
| Ball drop [mJ] 32.6 g | — | 463.72 | 463.72 |
| Push out [N/cm²] | 32 | 24 | 31 |
| Transverse impact toughness [mJ] | 270 | 469 | |
| PA steel [N/cm] | 7 | 5 | 6.8 |
| PA PE [N/cm] | 5 | 4.2 | 4.9 |
| Stripping force [N/cm] | 7 | 6 | 4.9 |
| Tears [#] 180° | 0 | 0 | 0 |
| Tears [#] 90° | 3 | 0 | 0 |

Examples 8 and 9 show the effect which foamed adhesives have on the peel angle of the adhesive strip.
Result:
A foamed three-layer construction still displays high shock robustness and no tears at 180° and 90° peel angles
At a 90° peel angle, a foamed three-layer construction is more tear-resistant than an unfoamed three-layer construction of equal thickness Test Methods Unless otherwise indicated, all of the measurements were conducted at 23° C. and 50% relative humidity.
The mechanical and technical adhesive data were determined as follows:

Resilience/Elasticity

To measure the resilience, the pressure-sensitive adhesive strips were extended by 100%, kept at this extension for 30 s and then released. After a wait time of 1 min, the length was measured again.
The resilience is then calculated as follows:

$$R=((L_{100}-L_{end})/L_0)*100$$

with R=resilience in
$L_{100}$: Length of the adhesive strip after extension by 100%
$L_0$: Length of the adhesive strip prior to extension
$L_{end}$: Length of the adhesive strip after relaxation for 1 min.
The resilience corresponds here to the elasticity.

Elongation at Break, Tensile Strength and Strain at 50% Elongation

The elongation at break, the tensile strength and the strain at 50% elongation were measured in accordance with DIN 53504 using dumbbell specimens of size S3 at a separation speed of 300 mm per minute. The test conditions were 23° C. and 50% rel. air humidity.

Detachment Force

The detachment force (stripping force or stripping strain) was determined by means of a film of adhesive with dimensions of 50 mm length×20 mm width having a non-adhesive grip tab region at the top end. The film of adhesive was adhered between two steel plates, arranged congruently to one another and with dimensions of 50 mm×30 mm, using an applied pressure of 50 newtons in each case. At their lower end, the steel plates each have a drilled hole for accommodating an S-shaped steel hook. The lower end of the steel hook carries a further steel plate, via which the test arrangement can be fixed, for measurement, in the lower clamping jaw of a tensile testing machine. The adhesive bonds are stored at +40° C. for a time of 24 hours. After reconditioning to room temperature, the adhesive film strip is pulled apart with a pulling speed of 1000 mm per minute, parallel to the bond plane and without contact with the edge regions of the two steel plates. During this procedure, the required detachment force in newtons (N) is measured. The figure reported is the average of the stripping strain values (in N per mm²), measured in the range in which the adhesive strip underwent detachment from the steel substrates over a bonding length of between 10 mm and 40 mm.

Tearing Test

Strips 10 mm wide and 40 mm long are produced by punching from the adhesive tape under investigation. These strips are adhered over a length of 30 mm to a PC plate conditioned with ethanol, thus leaving a grip tab 10 mm long. A second PC plate is adhered to the second side of the bonded strips, in such a way that the two PC plates lie flush one above the other. The assembly is rolled down 10 times (five times back and forth) using a 4 kg roller. After a take time of 24 h, the strips are stripped from the bonded joint by the grip tab, manually, at
a) a 90° angle and
b) a 180° angle.
An evaluation is made of how many specimens can be redetached without residue.

Tackifying Resin Softening Temperature

The tackifying resin softening temperature is conducted by the relevant methodology, known as ring & ball and standardized in ASTM E28.

DACP

The DACP is the diacetone cloud point and is determined by cooling a heated solution of 5 g of resin, 5 g of xylene and 5 g of diacetone alcohol to the point at which the solution turns cloudy.

Falling Ball Test (Impact Toughness, Ball Drop)

A square sample with a frame shape was cut from the adhesive tape under investigation (external dimensions 33 mm×33 mm; border width 3.0 mm; internal dimensions (window cutout) 27 mm×27 mm). This sample was adhered to an ABS frame (external dimensions 50 mm×50 mm; border width 12.5 mm; internal dimensions (window cutout) 25 mm×25 mm; thickness 3 mm). On the other side of the double-sided adhesive tape, a PMMA window measuring 35 mm×35 mm was adhered. The bonding of ABS frame, adhesive tape frame and PMMA window took place in such a way that the geometric centers and the diagonals lay in each case one above another (corner to corner). The bond area was 360 mm². The bond was pressed under 10 bar for 5 s and stored for 24 hours with conditioning at 23° C./50% relative humidity.
Immediately after storage, the bonded assembly of ABS frame, adhesive tape and PMMA window was placed, with the protruding edges of the ABS frame, on a frame rack (sample holder) in such a way that the assembly was aligned horizontally and the PMMA window pointed downward in free suspension. A steel ball of the weight indicated in each case was dropped centrally onto the PMMA window of the sample thus arranged, the drop being vertical from a height of 250 cm (through the window of the ABS frame) (measuring conditions 23° C., 50% relative humidity). With each sample, three investigations were carried out, unless the PMMA window had already detached.

The falling ball test is passed if the bond has not parted in any of the three investigations.

In order to be able to compare experiments with different ball weights, the energy was calculated as follows:

$$E=\text{height [m]}*\text{ball weight [kg]}*9.81 \text{ kg/m}*\text{s}^2$$

Push-Out Strength (z-Plane)

The push-out test provides information about the level of resistance of an adhesive bond of a component in a frame-shaped body, such as a window in a housing.

A rectangular, frame-shaped sample was cut out of the adhesive tape under investigation (external dimensions 43 mm×33 mm; border width 2.0 mm in each case, internal dimensions (window cutout) 39 mm×29 mm, bond area on top and bottom sides 288 mm² in each case). This sample was adhered to a rectangular ABS polymer frame (ABS=acrylonitrile-butadiene-styrene copolymers) (external dimensions 50 mm×40 mm, border width of the long borders 8 mm in each case; border width of the short borders 10 mm in each case; internal dimensions (window cutout) 30 mm×24 mm; thickness 3 mm). Adhered to the other side of the sample of the double-sided adhesive tape was a rectangular PMMA sheet (PMMA=polymethyl methacrylate) with dimensions of 45 mm×35 mm. The full bond area of the adhesive tape available was utilized. The ABS frame, adhesive tape sample and PMMA window were bonded in such a way that the geometric centers, the bisecting lines of the acute diagonal angles and the bisecting lines of the obtuse diagonal angles of the rectangles each lay on top of one another (corner on corner, long sides on long sides, short sides on short sides). The bond area was 360 mm². The bond was pressed under 10 bar for 5 s and stored with conditioning at 23° C./50% relative humidity for 24 hours.

Immediately after storage, the adhesive assembly composed of ABS frame, adhesive tape and PMMA sheet was placed with the protruding edges of the ABS frame onto a frame rack (sample holder) in such a way that the assembly was oriented horizontally and the PMMA sheet pointed downwards in free suspension.

A plunger is then moved perpendicularly from above through the window of the ABS frame at a constant speed of 10 mm/s, such that it presses centrally onto the PMMA plate, and the respective force (determined from respective pressure and contact area between plunger and plate) is recorded as a function of the time between first contact of the plunger with the PMMA plate up to shortly after the PMMA plate has dropped off (measuring conditions 23° C., 50% relative humidity). The force acting immediately before failure of the adhesive bond between PMMA plate and ABS frame (maximum force Fing in the force-time diagram, in N) is recorded as the outcome of the push-out test.

Transverse Impact Toughness; x,y-Plane

A square sample with a frame shape was cut from the adhesive tape under investigation (external dimensions 33 mm×33 mm; border width 3.0 mm; internal dimensions (window cutout) 27 mm×27 mm). This sample was adhered to an ABS frame (external dimensions 45 mm×45 mm; border width 10 mm; internal dimensions (window cutout) 25 mm×25 mm; thickness 3 mm). On the other side of the double-sided adhesive tape, a PMMA window measuring 35 mm×35 mm was adhered. The bonding of ABS frame, adhesive tape frame and PMMA window took place in such a way that the geometric centers and the diagonals lay in each case one above another (corner to corner). The bond area was 360 mm². The bond was pressed under 10 bar for 5 s and stored for 24 hours with conditioning at 23° C./50% relative humidity.

Immediately after storage, the bonded assembly of ABS frame, adhesive tape and PMMA window with the protruding edges of the ABS frame was clamped into a sample holder in such a way that the assembly was oriented vertically. The sample holder was subsequently inserted centrally into the intended holder of the DuPont impact tester. The impact head, weighing 300 g, was inserted such that the rectangular striking geometry with dimensions of 20 mm×3 mm was central and flush against the upwardly directed end-face side of the PMMA window.

A weight with a mass of 150 g, guided on two guide rods, was dropped vertically from a height of 3 cm onto the assembly thus arranged of sample holder, sample and impact head (measuring conditions 23° C., 50% relative humidity). The height of the falling weight was raised in steps of 3 cm until the impact energy introduced caused destruction of the sample as a result of the transverse impact load, and the PMMA window parted from the ABS frame.

In order to be able to compare experiments with different samples, the energy was calculated as follows:

$$E[J]=\text{height [m]}*\text{mass weight [kg]}*9.81 \text{ kg/m}*\text{s}^2$$

For each product, five samples were tested, and the average energy value was reported as a characteristic number for the transverse impact toughness.

Peel Adhesion

The determination of the peel adhesion (in accordance with AFERA 5001) is carried out as follows. The defined adhesion substrate used is galvanized steel plate with a thickness of 2 mm (acquired from Rocholl GmbH) or a polyethylene block, respectively. The bondable sheetlike element under investigation is cut to a width of 20 mm and a length of about 25 cm, provided with a handling section and immediately thereafter pressed down five times using a 4 kg steel roller, at a rate of advance of 10 m/min, onto the particular adhesion substrate selected. Directly following that, the bondable sheetlike element is peeled from the substrate at an angle of 180° and a speed v=300 mm/min, using a tensile testing instrument (from Zwick), and the force required to achieve this at room temperature is recorded. The measurement value (in N/cm) is the average value resulting from three individual measurements.

Static Glass Transition Temperature Tg

Glass transition points—referred to synonymously as glass transition temperatures—are reported as the result of measurements by means of differential scanning calorimetry (DSC) according to DIN 53 765, especially sections 7.1 and 8.1, but with uniform heating and cooling rates of 10 K/min in all heating and cooling steps (cf. DIN 53 765; section 7.1; note 1). The sample weight is 20 mg.

The invention claimed is:
1. A pressure-sensitive adhesive strip that is redetachable without residue or destruction by extensive stretching sub- stantially within a bond plane, the pressure-sensitive adhesive strip comprising a layer of adhesive consisting of:
a pressure-sensitive adhesive constructed on the basis of one or more vinylaromatic block copolymers and one or more tackifying resins, with selection to an extent of at least 75% by weight, based on a total tackifying resin content, of at least one tackifying resin having a DACP (diacetone alcohol cloud point) of greater than −20° C. and a softening temperature (ring & ball) of not less than 70° C., and the pressure-sensitive adhesive having been foamed by means of microballoons, wherein the absolute density of the foamed pressure-sensitive adhesive is 350 to 990 kg/m$^3$, and wherein the foamed pressure-sensitive adhesive comprises a surface having a surface roughness $R_a$ of less than 15 μm.

2. The pressure-sensitive adhesive strip of claim 1, wherein the one or more vinylaromatic block copolymers comprise polymer blocks predominantly formed from vinylaromatics (A blocks) and polymer blocks predominantly formed by polymerization of 1,3-dienes (B blocks).

3. The pressure-sensitive adhesive strip of claim 2, wherein the vinylaromatics for construction of the A block are ones selected from styrene, polystyrene, α-methylstyrene and/or other styrene derivatives.

4. The pressure-sensitive adhesive strip of claim 2, wherein a monomer for the B blocks is selected from the group consisting of butadiene, isoprene, ethylbutadiene, phenylbutadiene, piperylene, pentadiene, hexadiene, ethylhexadiene, and dimethylbutadiene, and mixtures of the monomers.

5. The pressure-sensitive adhesive strip of claim 1, wherein the one or more vinylaromatic block copolymers used are at least one synthetic rubber in the form of a block copolymer having an A-B, A-B-A, (A-B)$_n$, (A-B)$_n$X or (A-B-A)$_n$X structure, in which:
the A blocks are independently a polymer formed by polymerization of at least one vinylaromatic;
the B blocks are independently a polymer formed by polymerization of conjugated dienes having 4 to 18 carbon atoms and/or isobutylene, or a partly or fully hydrogenated derivative of the polymer;
X is the radical of a coupling reagent or initiator; and
n is an integer≥2.

6. The pressure-sensitive adhesive strip of claim 5, wherein the one or more block copolymer have an A-B structure and/or an A-B-A structure.

7. The pressure-sensitive adhesive strip of claim 1, wherein a proportion of the one or more vinylaromatic block copolymers in total, based on the overall pressure-sensitive adhesive, is at least 20% by weight and at most 75% by weight.

8. The pressure-sensitive adhesive strip of claim 7, wherein the proportion of the one or more vinylaromatic block copolymers in total, based on the overall pressure-sensitive adhesive, is at least 35% by weight and at most 55% by weight.

9. The pressure-sensitive adhesive strip of claim 1, wherein the pressure-sensitive adhesive includes 20% to 60% by weight of the one or more tackifying resins, based on the total weight of the pressure-sensitive adhesive.

10. The pressure-sensitive adhesive strip of claim 9, wherein the pressure-sensitive adhesive includes 30% to 50% by weight of the one or more tackifying resins, based on the total weight of the pressure-sensitive adhesive.

11. The pressure-sensitive adhesive strip of claim 1, wherein the one or more tackifying resins comprises at least 75% by weight of hydrocarbon resins, terpene resins, or a mixture thereof.

12. The pressure-sensitive adhesive strip of claim 1, wherein the absolute density of the foamed pressure-sensitive adhesive is 450 to 970 kg/m$^3$.

13. The pressure-sensitive adhesive strip of claim 1, wherein, if the pressure-sensitive adhesive has been applied to a carrier on one side of the carrier or two sides of the carrier, the absolute density of the foamed pressure-sensitive adhesive is between 500 to 990 kg/m$^3$.

14. The pressure-sensitive adhesive strip of claim 1, wherein the pressure-sensitive adhesive strip has a carrier to one side or two sides of which the pressure-sensitive adhesive is applied.

15. The pressure-sensitive adhesive strip of claim 14, wherein the carrier has an elongation at break of at least 100% and a resilience of more than 50%.

16. The pressure-sensitive adhesive strip of claim 1, wherein the pressure-sensitive adhesive strip is in the form of a diecut.

17. The pressure-sensitive adhesive strip of claim 1, wherein the foamed pressure-sensitive adhesive comprises a surface having a surface roughness $R_a$ of less than 10 μm.

18. The pressure-sensitive adhesive strip of claim 1, wherein a ratio of a tensile force to a stripping force of the pressure-sensitive adhesive strip is greater than two.

19. Bonded components comprising:
a first component;
a second component; and
the pressure-sensitive adhesive strip of claim 1 being double-sided and bonded to the first component and the second component,
wherein the first component comprises one or more electronic components and the second component comprises one or more electronic devices.

20. The bonded components of claim 19, wherein the one or more electronic devices comprises at least one cellphone.

* * * * *